May 5, 1931. S. P. TSCHAPPAT 1,804,290
COUPLING OR T FOR USE IN CONNECTION WITH OIL WELL TUBING
Filed May 19, 1930
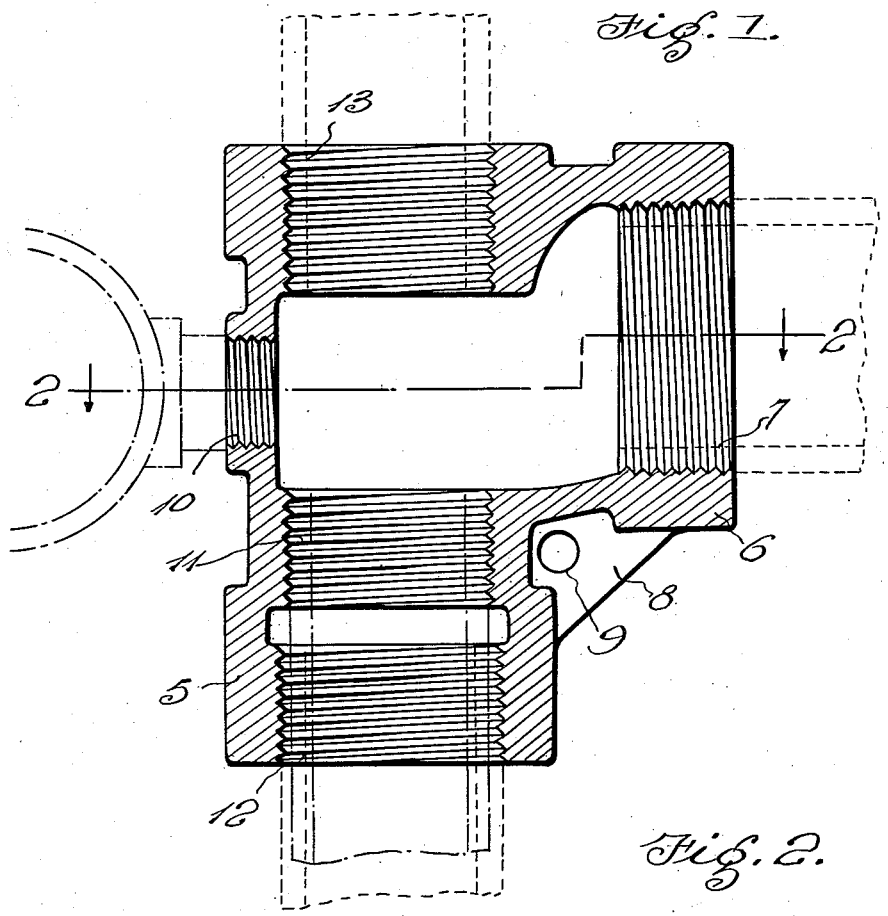
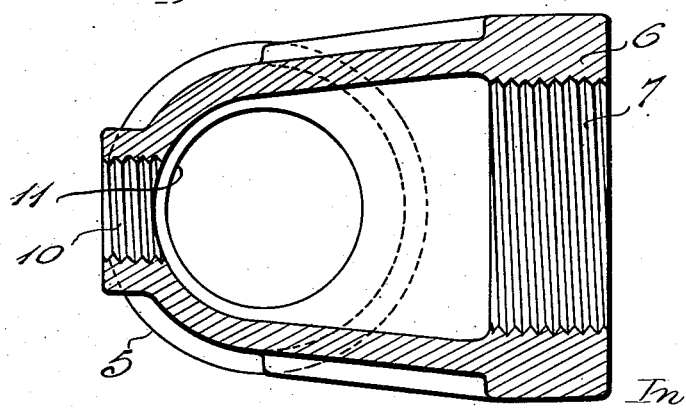
Inventor
Sheridan P. Tschappat
By
Attorney Patented May 5, 1931

1,804,290

UNITED STATES PATENT OFFICE

SHERIDAN P. TSCHAPPAT, OF TULSA, OKLAHOMA

COUPLING OR T FOR USE IN CONNECTION WITH OIL WELL TUBING

Application filed May 19, 1930. Serial No. 453,562.

My invention relates to a coupling or T for use in connection with oil well tubing.

Oil well tubing is provided with regular threads or upset threads. It is customary to attach a high pressure coupling or T to the end of the tubing projecting above the well. The couplings or T's as manufactured have a screw-threaded bore of a diameter to receive the end of the tubing having the regular screw-threads. When the tubing is provided with upset screw-threads, the screw-threaded end of the tubing is of larger diameter, and the ordinary coupling or T will not engage upon the same. When this occurs, the upper end of the tubing must be cut off and regular screw-threads cut upon the same, or a reducing swage nipple is mounted upon the upset screw-threaded end of the tubing, and will properly engage within the coupling or T. The use of the nipple often makes the connection on a well set up high, interfering with the pumping equipment.

In accordance with my invention, a coupling or T is provided which has its bore of different diameters as defined by the points of the screw-threaded portions, so that the coupling may be readily mounted upon the tubing having regular screw-threads or upset screw-threads, without the employment of a swage nipple. The use of the coupling saves considerable time.

In the accompanying drawings, forming a part of this specification, and in which like numerals are employed to designate like parts throughout the same, Figure 1 is a central vertical section through a coupling or T embodying my invention, and Figure 2 is a horizontal section taken on line 2—2 of Figure 1.

The coupling or T embodies a straight tubular body portion 5 and a lateral extension 6. This extension has a screw-threaded bore 7, for receiving the threaded end of the line pipe. The numeral 8 designates a reinforcing rib having a hole 9 therein. Arranged opposite the extension 6 is a screw-threaded opening 10, adapted to receive the screw-threaded end of a pressure gauge.

The tubular body portion 5 has its lower end provided with internal screw-threaded portions 11 and 12, and these screw-threaded portions have different bores or diameters, the screw-threaded portion 12 having a larger bore or diameter. The coupling is adapted to be mounted upon the end of the tubing extending from the well, and if this end of the tubing has regular screw-threads, such screw-threaded end will fit within the screw-threaded portion 11 and may be inserted through the screw-threaded portion 12 without having screw-threaded engagement therewith. If the upper end of the tubing has upset screw-threads, such screw-threaded portion will be of a larger diameter and will properly fit within the larger screw-threaded portion 12. It is thus seen that the coupling may be quickly and easily attached to the tubing, having either regular or upset screw-threads, without the necessity of cutting off the tubing and forming regular screw-threads or using the reducing swage coupling with the tubing having upset screw-threads. The upper end of the tubular body portion 5 has a screw-threaded portion 13 of a proper bore or diameter to receive the screw-threaded end of the tubing, and if desired, the screw-threaded portions having different diameters or bores, as explained in connection with the lower end of the coupling, may be formed within the upper end of the tubular body portion.

It is to be understood that the form of my invention, herewith shown and described, is to be taken as a preferred example of the same, and that various changes in the shape, size and arrangement of parts, may be resorted to, without departing from the spirit of my invention, or the scope of the subjoined claim.

Having thus described my invention, I claim:—

A coupling to be mounted upon a tubing having regular threads or upset threads, said coupling comprising an upstanding tubular body portion having a lateral tubular extension which is threaded for connection with a pipe, said tubular body portion being provided near its upper end with a threaded portion to engage with a tubing, said tubular body portion being provided in its lower portion with means for connection with tubing having regular or upset threaded portions of different diameters, said means comprising upper and lower internal screw threaded portions, the lower screw threaded portion having a larger diameter than the upper screw threaded portion, the arrangement being such that the lower screw threaded portion is adapted to engage upon a tubing having upset threads while the upper screw threaded portion is adapted to engage upon a tubing having regular threads.

In testimony whereof I affix my signature.

SHERIDAN P. TSCHAPPAT.